March 31, 1970  G. EBERLE  3,503,640
BALL JOINT
Filed Dec. 9, 1968

INVENTOR
GERHARD EBERLE
BY Jacobi & Donaldson
ATTORNEY

# United States Patent Office 3,503,640
Patented Mar. 31, 1970

3,503,640
BALL JOINT
Gerhard Eberle, Albershausen uber Goppingen, Germany, assignor to Metallwaren G.m.b.H., Eislingen, Salach, Wurttemberg, Germany
Filed Dec. 9, 1968, Ser. No. 782,255
Claims priority, application Germany, Dec. 7, 1967, 1,625,581
Int. Cl. B25g *3/38;* F16c *11/06*
U.S. Cl. 287—89                                7 Claims

ABSTRACT OF THE DISCLOSURE

A ball joint with an improved socket member made of an elastic plastic. The socket has a first and second ball receiving portion. The closure is integrally connected to the socket member of a hinge in the form of an elastic plastic film which is arranged parallel to the one or more slots. The closure may also be reinforced. A ball joint constructed in this manner is resilient and economical to produce.

---

This invention relates to ball joints and more especially to ball joints made from elastic plastic material.

Ball joints are known wherein a metal ball is introduced into a socket made of elastic plastic material. The socket is divided by a slot extending to the region of its shank to provide moveable ball receiving portions. After the introduction of the ball, the open end of the slot is pressed together with a spring so that the socket encloses and holds the ball securely. This spring is in the form of, for example, a bowed spring made of steel wire, which is relatively expensive to mount on the plastics material joint.

According to the present invention there is provided a ball joint comprising a socket member of an elastic plastic material having first and second ball receiving portions, adapted resiliently to engage about a ball member, and a closure member of an elastic plastic material adapted to retain the first and second moveable ball receiving portions in position about a ball member.

The socket member is preferably slotted, to provide the first and second member. In one form of joint the closure member is integrally connected to the socket member by means of a hinge in the form of an elastic plastic film, which film is arranged parallel to the slot.

The closure member may also include an extension which extends in a direction toward the slot at an acute angle to the axis of the closure member, the extension being adapted to engage a projection located on the socket member on the opposite side of the slot to the hinge of the closure member.

Figure 1:
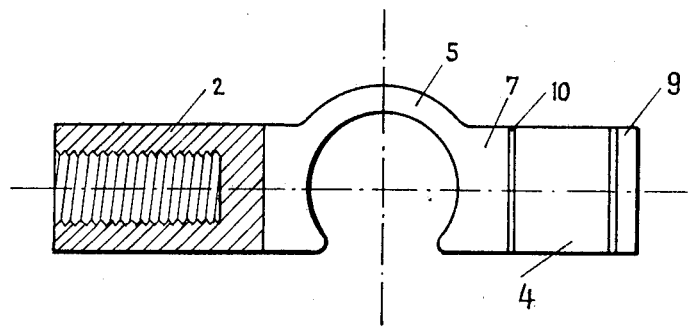
Figure 2:
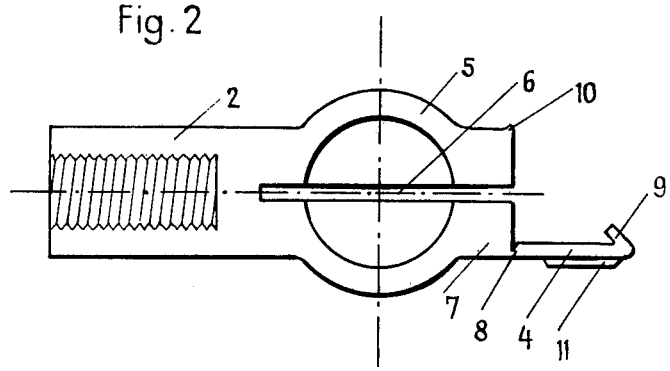

An illustrative embodiment of the invention will now be described with reference to the accompanying drawings, in which:

FIGURE 1 is a longitudinal sectional view through one form of ball socket joint with the moulded-on plastic material cap, and FIGURE 2 shows a sectional view at right angles to that shown in FIGURE 1.

Referring to the drawings the ball socket joint comprises a ball socket 5 and a shank 2, which is shown in section. Both the ball socket 5 and the shank 2 are made from a single plastics material e.g. a polyamide, which is produced by injection moulding and can be reinforced by fibre glass. The shank 2 includes an internally screwthread portion which is formed in the shank during the injection moulding operation. Alternatively, it is also possible to mould-in a screwthreaded sleeve to which the linkage is screwed.

As the drawings show, the socket is divided centrally so that a slot 6 is formed which extends as far as the beginning of the shank 2 to provide two moveable ball receiving portions. Thus the socket forms in a sense a fork which terminates in two ends. The joint also includes a plastics cap 4 for locking a steel ball head in position in the socket. If the plastics cap 4 is swung into the position shown in FIGURE 2, the ball head can be introduced into the socket. The fork then expands in opposition to the elastic force of the plastic material. After the introduction of the ball head into the fork, the cap 4 is swung in a counterclockwise direction about a hinge 8 from the position shown in FIGURE 2, until it locks with its extension 9 over the projection 10. To reinforce the plastic cap, it is provided on its back with a reinforcement 11. The ball head is then securely connected to the socket 5; owing to the action of the spring 4, the joint re-adjusts itself when wear occurs. Lubrication is not necessary, since there is no need for this owing to the frictional conditions between plastic material and steel. Also the ball head does not need to be either ground or hardened. In general, there is provided a particularly simple and inexpensive construction which is superior to hitherto known constructional forms.

In the case of relatively large joints, of course, it is also possible to provide several slots which extend from the outer periphery of the ball socket to the shank.

What we claim is:

1. A ball joint comprising a slotted socket member of an elastic plastic material having first and second ball receiving portions adapted resiliently to engage about a ball member, a closure member of an elastic plastic material adapted to retain the first and second movable ball receiving portions in position about a ball member, said closure member being integrally connected to said socket member by means of a hinge in the form of an elastic plastic film which is arranged parallel to the slot.

2. A ball joint according to claim 1, wherein the socket and closure members are formed from a single molding.

3. A ball joint according to claim 1, wherein said closure member is reinforced.

4. A ball joint according to claim 1, wherein said socket member includes a shank, and at least one slot extending from the outer periphery of the said socket member towards said shank.

5. A ball joint according to claim 1, wherein said closure member includes an extension which extends in a direction toward the slot at an acute angle to the axis of the closure member, the extension being adapted to engage a projection located on the socket member on the opposite side of the slot to the hinge of the closure member.

6. A ball joint according to claim 5, wherein said socket and closure members are formed from a single molding.

7. A ball point according to claim 5, wherein the closure member is reinforced.

References Cited

UNITED STATES PATENTS

| | | |
|---|---|---|
| 1,929,807 | 10/1933 | Casper. |
| 1,931,102 | 10/1933 | Casper. |
| 2,752,726 | 7/1956 | Calverley _____ 287—89 XR |
| 3,224,801 | 12/1965 | Price-Stephens et al. |
| 3,348,864 | 10/1967 | Ulderup. |

FOREIGN PATENTS

| | | |
|---|---|---|
| 660,303 | 5/1938 | Germany. |
| 198,143 | 6/1958 | Austria. |

DAVID J. WILLIAMOWSKY, Primary Examiner

A. KUNDRAT, Assistant Examiner

U.S. Cl. X.R.

287—21